United States Patent [19]
Miller

[11] Patent Number: 4,586,695
[45] Date of Patent: May 6, 1986

[54] CONTINUOUS TUBE EXTRACTOR

[76] Inventor: Charlie D. Miller, 6570 Rutger Rd., East Syracuse, N.Y. 13057

[21] Appl. No.: 623,554

[22] Filed: Jun. 22, 1984

[51] Int. Cl.$^4$ .............................................. B66F 1/08
[52] U.S. Cl. ...................................... 254/30; 29/252; 254/106
[58] Field of Search ......... 254/29 R, 30, 31, 105–107, 254/93 HP, 132; 29/252

[56] References Cited

U.S. PATENT DOCUMENTS

| | | | |
|---|---|---|---|
| 2,776,695 | 1/1957 | Wells | 254/30 |
| 2,967,044 | 1/1961 | Corcreham et al. | 254/30 |
| 3,998,428 | 12/1976 | Miles | 254/29 R |
| 4,171,631 | 10/1979 | Butts | 254/93 HP |
| 4,405,115 | 9/1983 | Boyadjieff | 254/106 |

FOREIGN PATENT DOCUMENTS 139276  3/1960  U.S.S.R. ................................ 254/30

Primary Examiner—Robert C. Watson
Attorney, Agent, or Firm—Bruns and Wall

[57] ABSTRACT

An apparatus for removing tubes from a tube sheet, wherein the tube to be removed is engaged from the side of the tube with the force for withdrawing the tube being applied against the outer peripheral surface of the tube by a tube-pulling device which, when in operative engagement with the tube to be removed, is positioned parallel to the tube and engages the outer peripheral surface thereof. A selectively actuable reciprocating hydraulic cylinder provides gripping engagement with the tube to incrementally retract the tube relative to the extracting apparatus, while continuously maintaining a positive engagement with the tube throughout the removal operation.

13 Claims, 7 Drawing Figures

CONTINUOUS TUBE EXTRACTOR

BACKGROUND OF THE INVENTION

This invention relates in general to an apparatus and method for removing tubes from a tube sheet and, in particular, to an apparatus and method which permits engagement of the tube from the tube side, rather than coaxially, to eliminate the necessity of engaging the axial end of the tube in order to remove the tube from the tube sheet as previously required.

More specifically, but without restriction to the particular use which is shown and described, this invention relates to an apparatus and method for side engagement of a tube to be removed from a tube sheet which will upon actuation continuously cycle to withdraw the tube from the tube sheet while allowing the tube to be withdrawn manually upon becoming sufficiently free.

As is known to those skilled in the art, certain types of heat exchange devices contain a plurality of heat exchange tubes which extend between or are supported by at least one tube sheet. These tube sheets comprise a support plate in which a series of holes are formed which correspond to the diameter of the tubes to be supported by the plate or tube sheet. The heat exchange tubes are then inserted into the holes in the tube sheet, and the ends of the tubes expanded such that the tubes are supported by the tube sheet, and held therein by the pressure contact between the tubes and the tube sheet.

Periodically, either to effect normal maintenance or due to the necessity of replacing one or all of the tubes used in the heat-exchange unit, tubes must be removed from the tube sheet. Since the heat-exchange unit in which the tubes are used will have to be shut down during this procedure, it is very important that the removal and replacement of the tubes be completed as quickly as possible. In order to expedite such removal and replacement, various devices have been constructed in an attempt to expeditiously remove the tubes from a tube sheet. While some of these devices, for example the tube pullers disclosed in U.S. Pat. Nos. 4,077,102 and 4,283,826 have met with some success, both of the devices disclosed in this prior art require that the pulling mechanism be positioned in axial alignment with the terminal end of a tube to be removed from the tube sheet. The present invention does not require such end-to-end axial alignment between the pulling device and the tube to be pulled from the tube sheet. The present invention permits engagement of a tube which is to be removed and/or replaced from the side, partially encircling the tube while applying an axial force to remove the tube from the tube sheet.

SUMMARY OF THE INVENTION

It is, therefore, an object of this invention to improve the method and apparatus for removing tubes from a tube sheet.

Another object of this invention is to facilitate the removal of tubes from a tube sheet by engaging the side of a tube to be removed rather than axially at an end thereof.

A further object of the present invention is to provide a tube extractor that can be passed radially over either a tube or a tube tap and apply an axially directed force thereto for pulling a tube from a tube sheet or the like.

Another object of the present invention is to provide a tube extractor than can be mounted laterally upon a tube or tube tap which is further capable of continually withdrawing the tube from a tube sheet or the like by means of a series of reciprocating strokes.

These and other objects are attained in accordance with the present invention, wherein there is provided an apparatus for removing tubes from a tube sheet, wherein the tube to be removed is engaged from the side of the tube with the force for withdrawing the tube being applied against the outer peripheral surface of the tube by a tube-pulling device which, when in operative engagement with the tube to be removed, is positioned parallel to the tube and engages the outer peripheral surface thereof. A selectively actuable reciprocating hydraulic cylinder provides gripping engagement with the tube to incrementally retract the tube relative to the extracting apparatus, while continuously maintaining a positive engagement with the tube throughout the removal operation.

DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout, wherein:

FIG. 5 is a partial front elevation of the tube-extracting mechanism illustrated in FIG. 2, with a tube engaged therewith to better illustrate the anti-retracting portion of the tube-extracting apparatus;

FIG. 7 is an enlarged partial sectional view of the adjustable apparatus for limiting the rotational movement of the anti-retracting jaws of the device.

DESCRIPTION OF A PREFERRED EMBODIMENT

Figure 1:
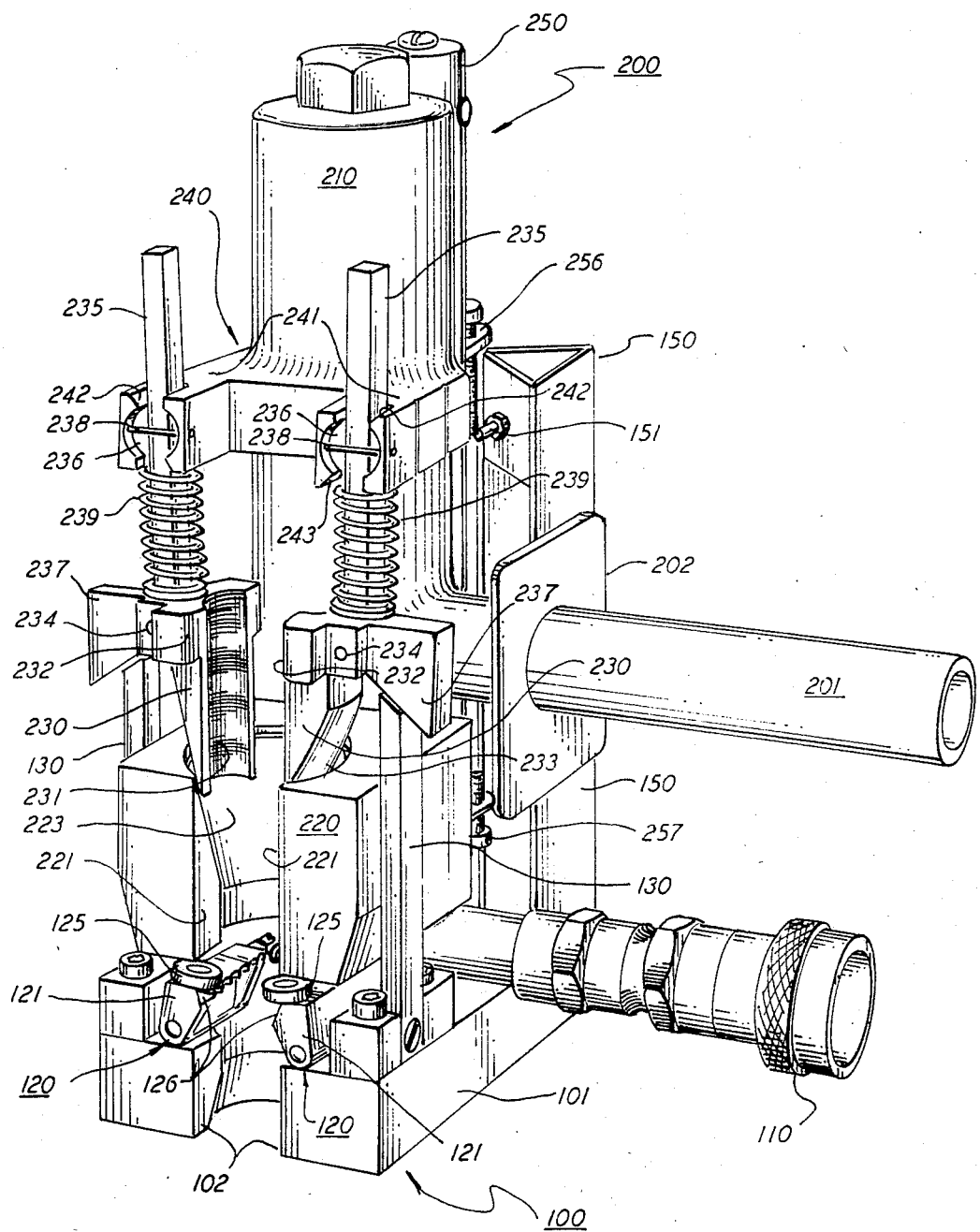
FIG. 1 is a perspective view of a tube-extracting apparatus constructed in accordance with the present invention and shown in an open position for engaging a tube to better illustrate the manner in which a tube to be extracted may be engaged from the side of the tube rather than at the axial end thereof.
Figure 2:
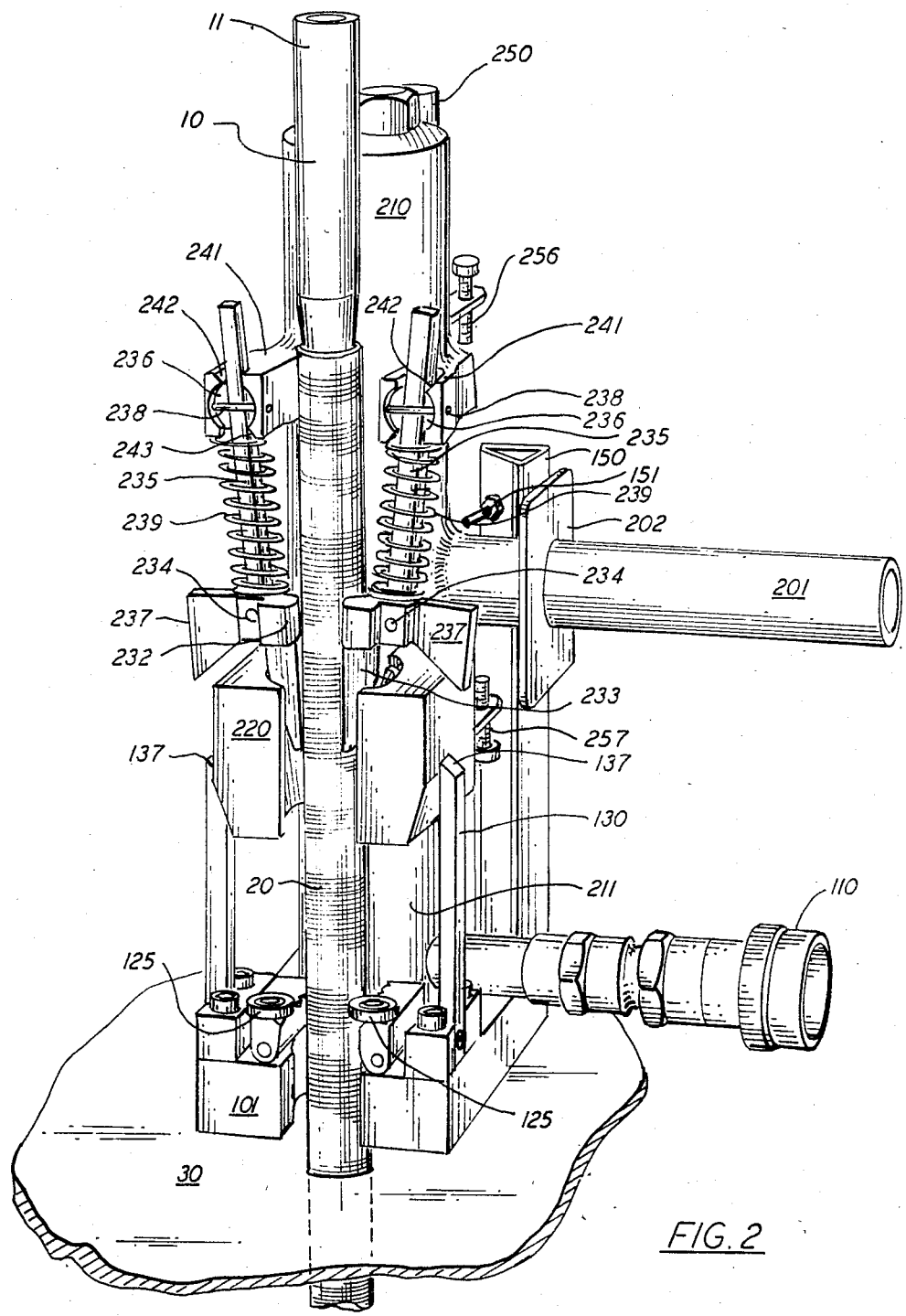
FIG. 2 is another perspective view of the tube-extracting apparatus illustrated in FIG. 1 shown engaging a tube and exerting a withdrawing force thereon.

Referring now to FIGS. 1 and 2, there is shown a tube-extracting apparatus, constructed in accordance with the present invention. The tube extractor comprises, two relatively movable sections, a base portion 100 which functions to provide a stable platform for application of an extracting force and a cylinder portion 200 which functions to provide a gripping structure for applying an extracting force to a tube to be extracted from a tube sheet. The cylinder portion 200 is movable outwardly away from the base portion 100 upon application of pressurized hydraulic fluid coupled into fluid communication with the base portion 100 through a quick-connect hydraulic coupling 110.

As is known to those skilled in the art, when beginning a tube pulling operation, a tube tap 10 having an extending shank portion 11 is secured into the end of tube 20 to be removed from a tube sheet 30. A base plate 101 of the tube extractor is then placed against the tube sheet 30, as shown in FIG. 2, and the extractor positioned to be adjacent the side of the tube 20 to be extracted. To assist in proper positioning of the tube extractor against the tube sheet, and the side of the tube to be extracted, a handle 201 is secured, as by welding, to the outer portion of a cylinder housing 210 of the cylinder portion 200. The handle 201 includes a hand guard 202 to protect an operator when placing, or removing, the tube extractor upon initiating or completing a tube-extracting operation.

Figure 3:
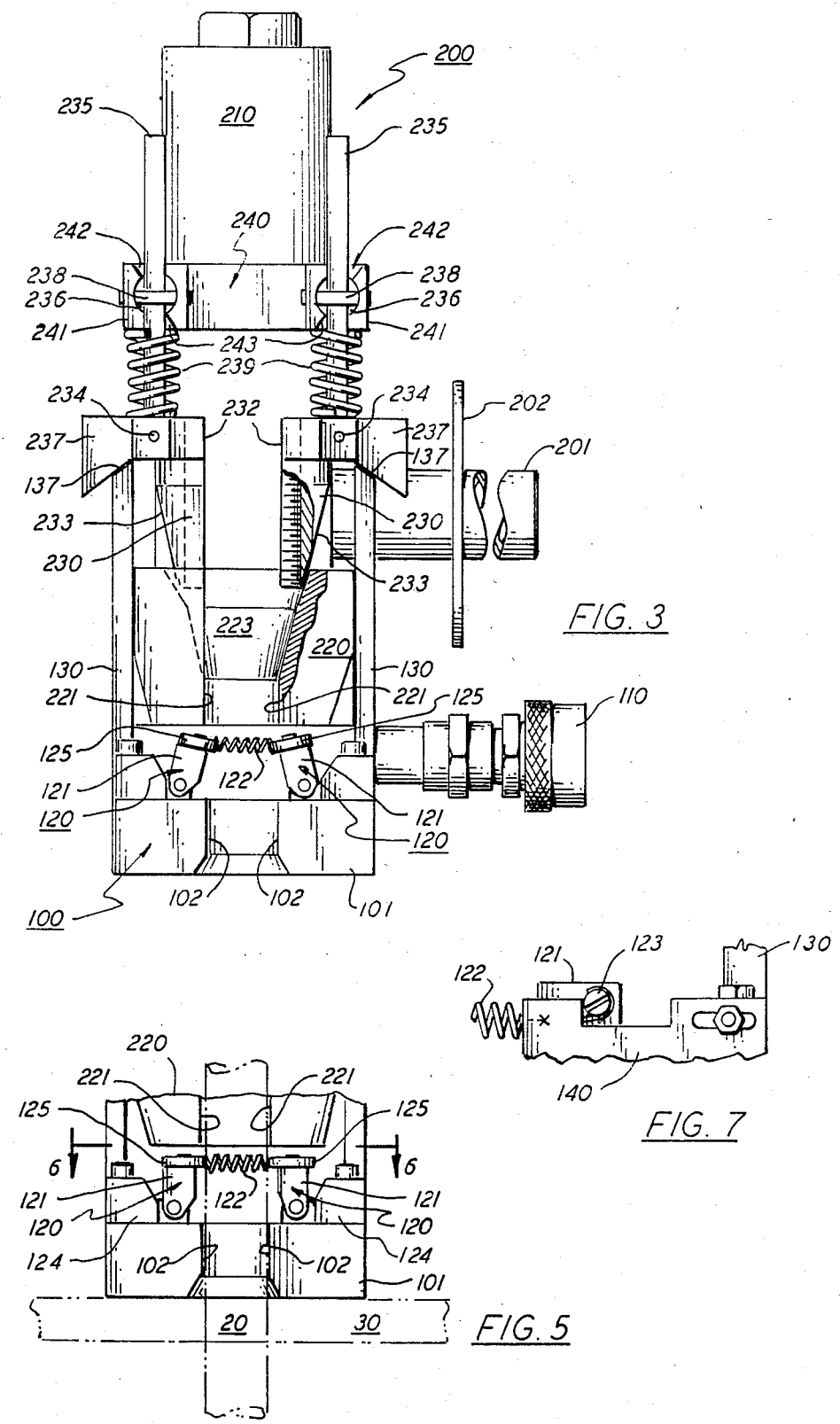
FIG. 3 is a front planer view of the tube-extracting apparatus illustrated in FIG. 1 in a position to engage a tube for removal from the tube sheet.
Figure 4:
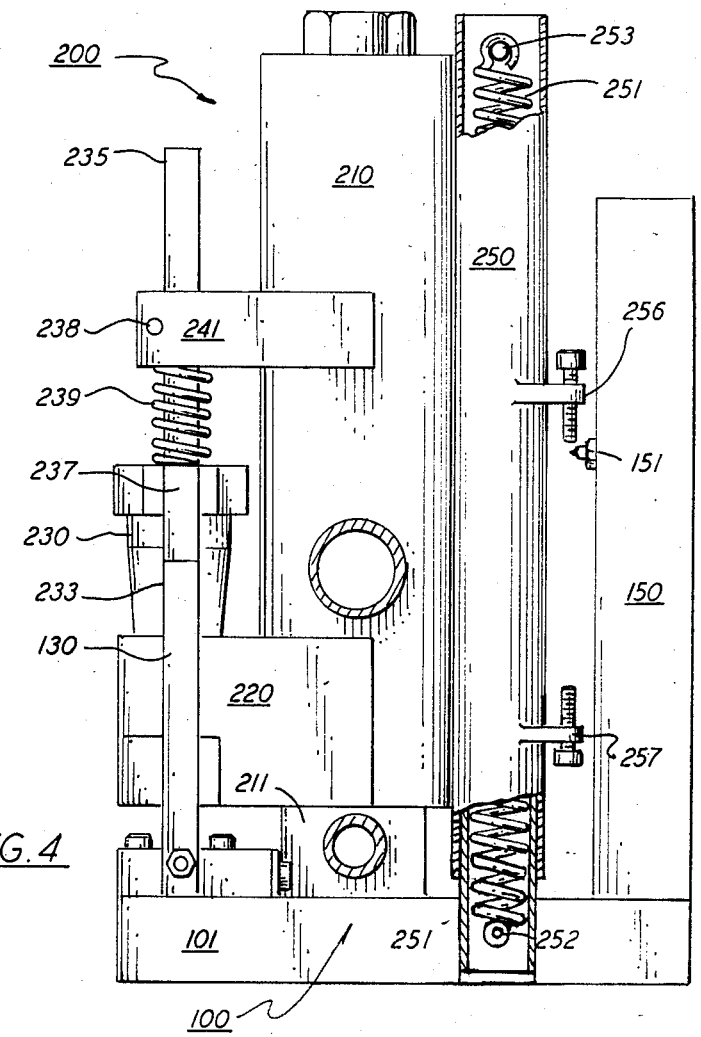
FIG. 4 is a side profile view of the tube-extracting mechanism illustrated in FIG. 3.

In order to receive the tube tap 10, the tube extractor is in the condition illustrated in FIGS. 1, 3 and 4 to receive the shank portion between the edges of an entrance opening 102 formed in the base 101, jaws 121 of an anti-retracting mechanism 120, an entrance opening 221 formed in an extracting collet 220, and a pair of cam-actuated extracting jaws 230 which function to grasp the tap 10 and subsequently the outer peripheral surface of the tube 20, during the extracting operation. As best shown in FIG. 1, the inner peripheral tube-contacting surface of the extracting jaws 230 is formed with a plurality of serrated grooves 231 for gripping the outer surface of the tube 20 during removal operations.

To facilitate the insertion of the tube tap into the tube extractor, the leading edges 232 of the entrance into the bite of the extracting or tube-pulling jaws 230 is undercut or rounded. The extracting jaws 230, as also shown in FIG. 3, are positioned at their maximum opening to permit the extractor to be freely positioned into engagement with, or be removed from, the tube 20. These tube-extracting jaws 230 are each pivotally connected to the lower end of a slide rod 235 by means of a pivot pin 234. Extending outwardly from each extracting jaw 230 is a cam follower 237 positioned for engaging a camming surface 137 formed at the upper end of each of a pair of vertically-extending spreader bars or posts 130. These spreader bars are each secured in spaced positions at opposite sides of the base plate 101.

The slide rods 235, upon which the tube-extracting jaws 230 and cam follower 237 are pivotally connected, are each in turn pivotally and slidably supported from a bifurcated yoke member 240. The yoke member 240 is secured, as by welding, to the cylinder housing 210 of the cylinder portion 200, and has a pair of outwardly-extending arms 241 in which the slide rods 235 are pivotally supported at the outer ends thereof by a suitable bearing 236 and roll pin 238. As best shown in FIG. 3, the upper-outer portion 242 and lower-inner portion 243 of each of the outer ends of the arms 241 are undercut to permit the slide rods 235 to pivot inwardly from the position shown to engage a tube 20, as illustrated in FIG. 2. A coil spring 239 encircles each slide rod 235 and is carried between the lower portion of each of the bifurcated arms 241 and the upper surface of each cammed extracting jaw 230. The springs 239 exert a downward force biasing the slide rods down and the cam followers 237 associated with each extracting jaw 230, against the cam surface 137 of each spreader bar 130 to effect a downward and inward pivotal movement of the two jaws into contact with the tube 20 when the cylinder portion 200 is raised during tube extraction.

After the tube extractor has been placed about the tube tap for removal of a tube, pressurized hydraulic fluid is coupled into the base portion 100 through the quick-connect adapter 110 causing the cylinder portion 200 to be raised upwardly relative to the base plate 101. This hydraulic action raises the extracting collet 220 so that an inner-tapered surface thereof 223 contacts a complementary tapered outer surface 233 of the extractor jaws 230 securing the jaws against the tube tap 10, and subsequently the tube 20. In this manner the extracting force is applied to the tube through the collet 220, squeezing the extracting jaws 230 into gripping engagement about the outer peripheral surface of the tube to thereby prevent any relative movement between the tube and jaws.

As the force exerted by the pressurized hydraulic fluid increases, the force holding the tube 20 in the tube sheet 30 will be overcome. The tube 20 will move outwardly from the tube sheet in the grasp of the gripping teeth 231 of the extracting jaws 230, a distance determined by the vertical movement of the cylinder portion 200 relative to the base portion 100. When a predetermined vertical distance, or stroke length, has been reached, in a manner to be hereinafter described in detail, the cylinder portion 200 is retracted to a starting position for beginning a new extracting cycle. To this end, a spring-containing spring housing 250 is secured to the cylinder housing 210, as by welding, for movement therewith. The spring housing 250 contains a return spring 251 which is fixed at a lower end 252 to the base 101, with the upper end 253 secured to the spring housing. The return spring 251 provides a biasing force to return the cylinder portion 200 to a starting position for beginning a new cycle, or initiating/terminating an extracting operation, upon termination of the hydraulic pressure applied to the base portion 100 through the quick-coupling/disconnect inlet 110.

Figure 6:
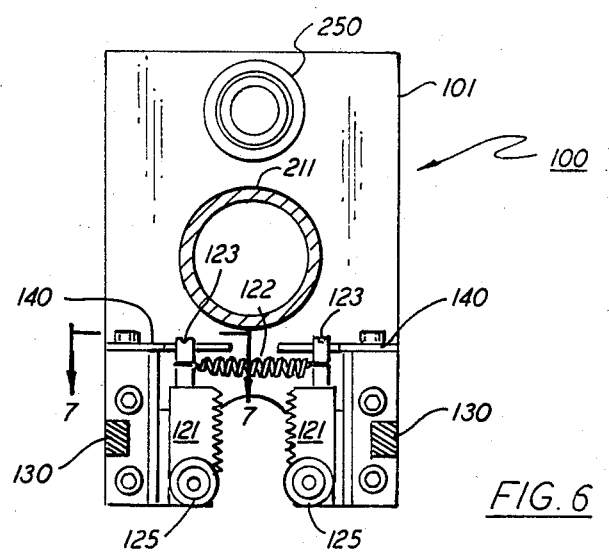
FIG. 6 is a sectional view of the tube-extracting apparatus illustrated in FIG. 5 taken along lines 6—6 to better illustrate the adjusting feature of the anti-retracting jaws of the device.

In order to hold the tube 20 in position for further extraction, the pair of anti-retracting units 120 are positioned on both sides and adjacent to the entrance opening 102 in base plate 101. Each of the units includes a jaw portion 121 formed with a series of teeth for engaging the tube. The pair of anti-retracting units 120 are pivotally secured at the lower end thereof to the top portion of the base 101 and positioned on each side of the entrance opening 102. The units 120 are coupled together by a spring 122 (best shown in FIGS. 5 and 6) which engages an extended portion 123 of each unit. Accordingly, the units are biased in favor of a self tightening position whereby the units bite against the tube when it is released by the extracting jaws but yet enable the jaws, when in engagement with the tube, to pull the tube upwardly away from the tube sheet 30.

The anti-retracting units 120 each have a roller 125 carried at the entrance into the bite formed therebetween, and the leading edge corner 126 of each is relieved to facilitate attaching the tube extractor to the tube tap when initiating an extracting cycle. While the spring 122 exerts a force biasing the pivotally mounted units 120 toward each other, a predetermined opening or space is maintained between the adjacent jaws 121. The members 120 are pivotably mounted in stationary blocks 124 secured to baseplate 101. A pair of adjustable stops 140 (best shown in FIGS. 6 and 7) are each secured to the base 101 for engaging the extension portion 123. Each stop 140 may thereby be individually adjusted to limit the inward rotational movement of the stops 120, for example, to the extent illustrated in FIG. 3. In this position, when the extactor is being placed about a tube tap to begin an extracting operation, the rollers 125 facilitate the insertion of the tube tap by spreading the units 120 each such as shown in FIG. 5. In this position, the units 120 prevent reverse movement of the tube being extracted.

To better understand additional structural features of the invention, the manner in which the tube extractor operates will be described. When beginning an extracting operation, the tube extractor is as shown in FIG. 1. The cylinder portion 200 is at its lowermost position relative to the base 101 of the base portion 100. The cam follower 237 of the tube-engaging jaws 230 is in contact with the camming surface 137 of the spreader bar or post 130, causing the jaws 230 to be pivoted away from each other to the maximum extent possible, leaving the space therebetween free for engagement with the tube tap 10. The extracting collet 220 is positioned at its lowermost position with the springs 239 compressed so that the tube-engaging jaws 230 can be pivoted to their maximum opening free from contact with the tapered inner surface 223 of the collet. The anti-retracting units 120 are held against the adjustable stops 140, ready to receive a tube tap 10.

Upon positioning the tube extractor along side of the tube tap 10 and tube 20, with the tube tap 10 positioned between the extracting jaws 230 and anti-retracting units 120, a master switch (not shown) is closed initiating an extracting operation. A source of pressurized fluid is thereby coupled to the base portion 100 causing the cylinder portion 200 to rise.

The extracting collet 220 will rise with the cylinder housing 210, but the mounting of the extracting jaws 230 on the slide rods 235 will delay their upward movement by springs 239. The inner tapered surface 223 of the collet will thereby engage the tapered outer surface 233 of the extracting jaws 230, pivoting the jaws into gripping engagement with the tube tap 10.

Movement of the tube 20 upwardly through the antiretracting units 120 will pivot the jaws 121 away from each other while the tube is withdrawn therebetween. The cylinder housing 210 and spring housing 250 will continue moving outwardly from the base 101 until such time as an adjustable lower switch actuator 257, secured to a portion of the spring housing 250, contacts a cycle switch 151 held in a predetermined vertical position by means of a bracket 150 supported on base 101. At this time, actuation of cycle switch 151 will stop the flow of pressurized fluid to the base portion 100 and the cylinder portion 200 will be pulled downwardly toward the base plate 101 by means of the return spring 251.

The return spring 251 will pull the cylinder portion 200 downwardly toward its initial position, while the biasing action of the spring 122 applies an inwardly pivotal force to the anti-retracting units 120 holding the tube tap 10, or tube 20, in the outermost position to which it had been extracted. The initial downward movement of the extracting collet 220 relieves its contact with surfaces 233 of the jaws 230 compressing springs 239. When contact of internal surfaces 231 of jaws 230 to the tube 20 is sufficiently relieved, the pressure of springs 239 will cause the jaws to follow the collet 220 in its now downward directed movement while still maintaining sliding contact with the tube. As the return spring 251 pulls the extended cylinder portion 200 downwardly over the tube surface, an adjustable upper switch actuator 256, carried on an upper portion of the spring housing 250, will reactuate cycle switch 151 to begin another cycle of tube extraction.

The positioning of the upper switch actuator 256 is set such that another extraction cycle will be initiated before the cylinder portion 200 returns to the initial position wherein the cam follower 237 of the tube-extracting jaws 230 engages the camming surface 137 and are thereby spread sufficiently wide to allow the tube to pass therefrom. In this manner, the tube extractor can continuously cycle, performing the tube-extracting operation under the control of the cycle switch 151 and the actuation thereof by the upper and lower switch actuators 256 and 257, respectively.

When the cylinder portion 200 has retracted to the position wherein the cycle switch 151 is actuated by the upper switch actuator 256, the flow of pressurized hydraulic fluid will cause the cylinder portion 200 to again be extended from the base portion 100, initiating another extracting cycle.

Since the anti-retracting units 120 are biased inwardly to prevent retraction of the tube tap/tube, when the tube 20 has been freed sufficiently from the tube sheet 30 for manual removal, an operator can freely pull the tube outwardly through the tube puller. When the extracting operation is completed, the master switch is opened, isolating the cycle switch 151 and terminating the reciprocating action heretofore under the cycle switch control. The cylinder portion 200, under the action of return spring 251, will then retract to the initial position wherein the cam followers 237 of the tube-extracting jaws 230 engages the cam surface 137 of the spreader post 130. This causes the jaws 230 to be moved to their fully-open position, and permits the tube extractor to be positioned adjacent the next tube for its next extracting operation.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawings, and described in the specification as the best mode presently contemplated for carrying out this invention, but that the invention will include any embodiments falling within the scope of the appended claims.

What is claimed is:

1. A continuous tube extractor for extracting tubes from a tube sheet comprising a base member positionable on a tube sheet adjacent to a tube to be extracted therefrom, said base member having an opening formed in a side thereof through which a tube to be extracted is received, fluid actuated cylinder means carried on said base member and movable relative thereto upon the application of fluid pressure for applying an axial extraction force to a tube, gripping means carried by said fluid actuated cylinder means for movement therewith and actuable to grip a tube for extraction from a tube sheet, said gripping means having a side opening formed therein for receiving therethrough a tube to be gripped for extracting from a tube sheet, control means coupled to said hydraulically actuated cylinder means for actuating the axial movement thereof, and said fluid actuated cylinder means being operatively connected to said gripping means so that axial movement of said cylinder means will actuate said gripping means to grip a tube to be extracted and apply an axially disposed extraction force thereto, said gripping means including a pair of jaws coupled to said fluid actuated cylinder for at least limited travel axially and radially with respect thereto, and having generally cylindrical gripping faces for distributing gripping forces on said tube to be extracted over a substantial cylindrical contact area thereon, collet means movable with said fluid actuated cylinder means for urging said jaws into engagement with said tube when said cylinder means is moved to an extended position, and means for positively urging said pair of jaws apart and maintaining the same in an open position to permit insertion of said tube through the opening in the side of the tube extractor when said cylinder is moved to a withdrawn position.

2. The apparatus of Claim 1 further including anti-retracting means carried on said base member and positioned to engage a tube passed through said opening in said base member for applying a force to the tube to prevent movement thereof except in the direction in which an extracting force is applied.

3. A continuous tube extractor for extracting tubes from a tube sheet comprising a base member positionable on a tube sheet adjacent to a tube to be extracted therefrom, said base member having an opening formed in a side thereof through which a tube to be extracted is received, fluid actuated cylinder means carried on said base member and movable relative thereto upon the application fluid pressure for applying an axial extraction force to a tube, gripping means carried by said fluid actuated cylinder means for movement therewith and actuable to grip a tube for extraction from a tube sheet, said gripping means having a side opening formed therein for receiving therethrough a tube to be gripped for extracting from a tube sheet, control means coupled to said fluid actuated cylinder means for actuating the axial movement thereof, said cylinder means being operatively connected to said gripping means so that axial movement of said cylinder means will actuate said gripping means to grip a tube to be extracted and apply an axially disposed extraction force thereto, and anti-retracting means carried on said base member and positioned to engage a tube passed through said opening in said base member for applying a force to the tube to prevent movement thereof except in the direction in which an extracting force is applied, wherein said anti-retracting means comprise a pair of pivotally mounted gripping jaws positioned adjacent said opening in said base with one of said gripping jaws being positioned on each side of said opening, a spring coupled at each end to one of said gripping jaws for applying a self-tightening force to said jaws for biasing said jaws inwardly toward each other, and adjustable stop means supported on said base member and positioned to engage said jaws to control the spacing therebetween.

4. The apparatus of claim 3 wherein each one of said pair of pivotally mounted gripping jaws includes a roller mounted thereon which is positioned at a leading edge of said jaws adjacent to the entrance of said opening in said base member to facilitate the engagement of a tube to be extracted.

5. The apparatus of claim 1 wherein said jaws are provided as a pair of pivotally mounted extracting jaws spaced apart to receive therebetween a tube to be extracted, said collet means include an extracting collet having an opening in a side thereof through which a tube to be extracted may be received, and said extracting collet being movable into engagement with said pair of extracting jaws for closing said jaws about a tube positioned therebetween and exerting an axial extraction force thereon.

6. The apparatus of claim 5 wherein the leading edge of each of said extracting jaws through which a tube to be extracted is received, is rounded to facilitate engagement of a tube to be extracted.

7. The apparatus of claim 5 wherein said pair of pivotally mounted extracting jaws are further pivotally mounted to said cylinder means for movement into and out from engagement with a tube, and also mounted thereon for limited sliding movement in an axial direction relative to said cylinder means.

8. A continuous tube extractor for extracting tubes from a tube sheet comprising;

a base member positionable on a tube sheet adjacent to a tube to be extracted therefrom, said base member having an opening formed in a side thereof through which a tube to be extracted is received, fluid actuated cylinder means carried on said base member and movable relative thereto upon the application of fluid pressure for applying an axial extraction force to a tube, gripping means carried by said hydraulically actuated cylinder means for movement therewith and actuable to grip a tube for extraction from a tube sheet, said gripping means having a side opening formed therein for receiving therethrough a tube to be gripped for extracting from a tube sheet, control means coupled to said fluid actuated cylinder means for actuating the axial movement thereof, and said cylinder means being operatively connected to said gripping means so that axial movement of said cylinder means will actuate said gripping means to grip a tube to be extracted and apply an axially disposed extraction force thereto, wherein said gripping means include;

a pair of pivotally mounted extracting jaws spaced apart to therebetween receive a tube to be extracted, an extracting collet having an opening in a side thereof through which a tube to be extracted may be received, and said extracting collet being movable into engagement with said pair of extracting jaws for closing said jaws about a tube positioned therebetween and exerting an axial extraction force therethrough, wherein said pair of pivotally mounted extracting jaws are further pivotally mounted to said fluid activated cylinder means for movement into and out from engagement with a tube, and also mounted thereon for limited sliding movement in an axial direction relative to said cylinder, said continuous tube extractor further comprising a cam follower portion formed on each of said extracting jaws for engaging a camming surface to effect pivotal and sliding movement of said extracting jaws relative to said fluid actuated cylinder means, and a pair of spreader posts supported from said base member in a position to engage said cam follower portions of said extracting jaws and having an upper end forming a camming surface engageable by said cam follower portion to pivot said jaws outwardly and permit said cylinder means to move axially in a downward direction relative thereto for releasing said extracting jaws from engagement with a tube being extracted.

9. The apparatus of claim 7 further including an upper switch actuator and a lower switch actuator carried, respectively, by said fluid actuated cylinder means at an upper and lower portion thereof for sequentially engaging a cycle switch, and a cycle switch supported upon said base member for controlling the movement of said cylinder means in response to the sequential actuation of said cycle switch by said upper and lower switch actuators.

10. The apparatus of claim 9 further including a master switch coupled with said cycle switch and actuable to terminate the cyclic opertion of said fluid actuated cylinder means.

11. The apparatus of claim 10 further including a handle secured to said fluid actuated cylinder means for positioning said apparatus on a tube sheet adjacent to a tube to be extracted, and a quick connect hydraulic coupling in fluid communication with said cylinder means for coupling to a source of pressurized fluid.

12. The apparatus of claim 8, wherein said extracting collet is slidably mounted between said spreader posts, and said collet means has a tapered outer surface at its lower end to prevent said spreader posts from blocking movement of said collet.

13. The apparatus of claim 1 wherein said pair of jaws are each double pivoted at two respective locations for each jaw to ensure that the gripping forces on the tube are spread over said cylindrical contact area.

. * * * * *